United States Patent
Bulger et al.

(10) Patent No.: US 11,684,881 B1
(45) Date of Patent: Jun. 27, 2023

(54) VAPOR PARTICLE SEPARATOR

(71) Applicant: NIFCO AMERICA CORP., Canal Winchester, OH (US)

(72) Inventors: Christopher Keegan Bulger, Canal Winchester, OH (US); William Russell Rhoades, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 0 days.

(21) Appl. No.: 17/546,754

(22) Filed: Dec. 9, 2021

(51) Int. Cl.
*B01D 45/08* (2006.01)
*B60K 15/03* (2006.01)

(52) U.S. Cl.
CPC .............. *B01D 45/08* (2013.01); *B60K 15/03* (2013.01)

(58) Field of Classification Search
CPC ................................ B01D 45/08; B60K 15/03
See application file for complete search history.

(56) References Cited

U.S. PATENT DOCUMENTS

| | | | | |
|---|---|---|---|---|
| 2003/0115843 A1* | 6/2003 | Haland | ................... | B04C 11/00 55/455 |
| 2005/0247619 A1* | 11/2005 | Berger | .............. | H01M 8/04141 96/155 |
| 2009/0016872 A1* | 1/2009 | Anghileri | ................ | F02C 7/055 415/121.2 |
| 2012/0103423 A1* | 5/2012 | Schook | ..................... | B04C 3/00 137/1 |
| 2021/0060582 A1* | 3/2021 | Son | ........................... | B04C 5/04 |
| 2022/0379250 A1* | 12/2022 | Moine | ................ | C23C 16/4412 |

FOREIGN PATENT DOCUMENTS

| | | | | | |
|---|---|---|---|---|---|
| CA | | 2814468 A1 | * | 8/2014 | ............. B01D 45/08 |
| GB | | 888237 A | * | 1/1962 | ............. B01D 45/08 |

* cited by examiner

*Primary Examiner* — Dung H Bui
(74) *Attorney, Agent, or Firm* — Manabu Kanesaka

(57) ABSTRACT

A vapor particle separator includes a housing having an inlet port in fluid communication with the outlet of the fuel tank, an outlet port in fluid communication with the inlet port of the vapor canister and a drain port in fluid communication with the filler neck. The inlet port has deflector ribs and a centralized nose cone creating a straight flow path resulting in less restriction in the fuel vapor flow. As the mixture flows along the inlet passage, it is forced through the deflection ribs and nose cone at which time the droplets and vapors are separated. The separated droplets and vapors flow from the inlet passage into the inlet pipe. The outlet passage and the drain portion allow the lite weight vapors to rise up into the outlet passage and out the outlet portion while gravity pulls the heavier weight droplets down into the return portion.

5 Claims, 7 Drawing Sheets

VAPOR PARTICLE SEPARATOR

FIELD OF THE INVENTION

The present invention relates to a fuel system for a vehicle and more particularly to a vapor particle separator.

BACKGROUND OF THE INVENTION

A vehicle fuel system includes a fuel tank with an in-tank fuel pump for transporting fuel from the fuel tank to the engine. Evaporative emission system is used to discharge fuel vapor that accumulates within the fuel tank through a vapor tube into a vapor canister and then to the engine. Unfortunately, the fuel vapor carries liquid droplets which damages capacity and performance of the vapor canister.

In this respect vapor particle separator is used in a line between the fuel tank and the vapor canister to prevent fuel droplets from being introduced into the vapor canister. The current vapor particle separator includes an inlet port (coming from the fuel tank), an outlet port (going to the vapor canister) and a drain port (going to the fill neck). The inlet port and the outlet port are divided by walls that create a labyrinth or maze type flow path resulting in flow maneuvers of the fuel vapors to prevent droplets from escaping through the outlet port and providing enough surface area to allow the droplets to be arrested by the walls and drip down through the drain port as the vapors escape through the outlet port into the vapor canister.

The labyrinth or maze type flow path has a direct effect on the ratio of percentage of separation and pressure loses within the flow of the fuel system. Typically, the higher the percentage of separation, the greater the loss in flow pressure with the type of the liquid vapor separator.

It is an object of the present invention to provide a vapor particle separator for the fuel system of a vehicle that will increase the percentage of separation while not decreasing the pressure in the vapor flow. Other objects and advantages of the invention will be apparent from the following description of the invention.

SUMMARY OF THE INVENTION

A vapor particle separator in a fuel system with a fuel tank of the invention comprises a separator housing including a space therein, an inlet portion adapted to receive fuel vapor and supply the fuel vapor to the space, an outlet portion extending from the space, and a return portion extending from the space and connected to the fuel tank, and a separator situated in the space of the separator housing and having a plurality of deflector ribs.

The fuel vapor enters the inlet portion and flows in and around the deflector ribs so that vapor particles are separated from the fuel vapor by the deflector ribs and exit through the outlet portion while droplets of the fuel vapor separated by the deflector ribs are returned to the fuel tank through the return portion.

The inlet port has a centralized nose cone creating a straight flow path resulting in less restriction in the fuel vapor flow. The deflection ribs and nose cone prevent the droplets from escaping through the outlet port and provide the needed surface area to allow the droplets to be arrested and then drip down through the return port as the vapors escape through the outlet port into the vapor canister.

DETAILED DESCRIPTION OF THE INVENTION

The following detailed description is exemplary in nature and is not intended to limit application and use. Furthermore, there is no intention to be bound by any theory presented by the following detail.

Figure 1:
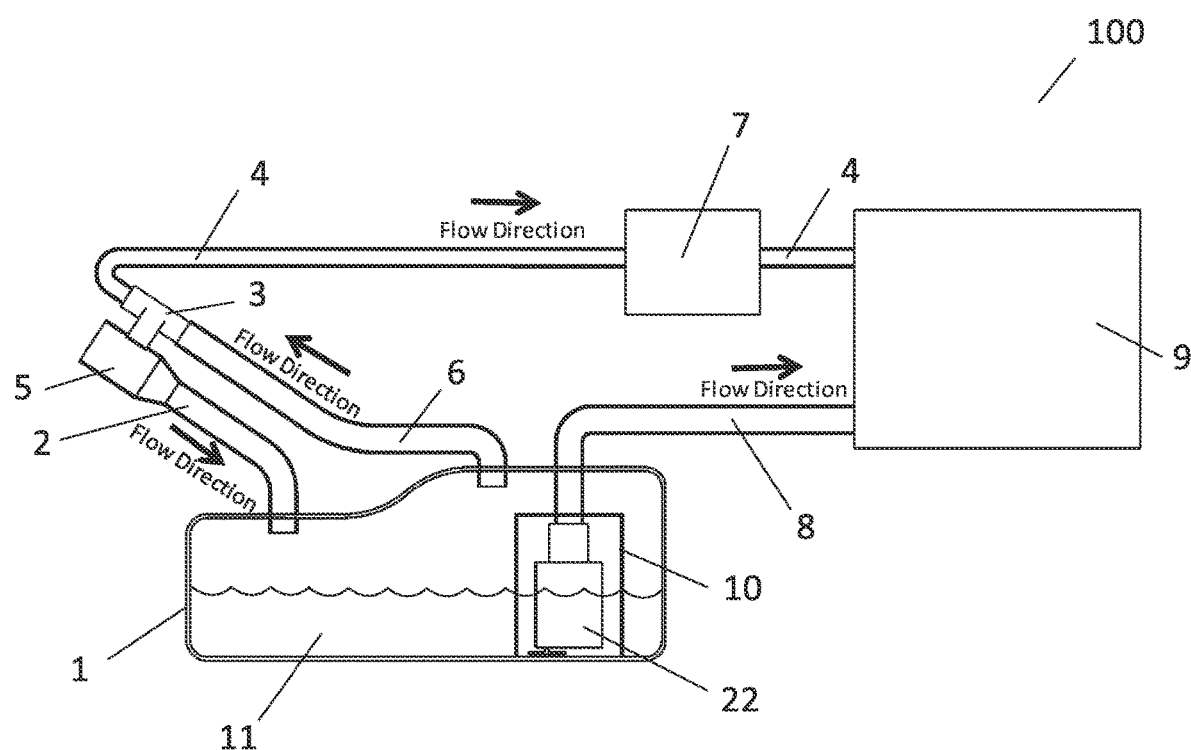
FIG. 1 is a schematic representation of a portion of a vehicle fuel system including an embodiment of a vapor particle separator of the invention.

FIG. 1 shows the components of a vehicle fuel system 100. The fuel system 100 include, a fuel tank 1, a fill neck 5, a vapor particle separator 3, a vapor or carbon canister 7, a fuel pump module 10 with an in-tank fuel pump 22 for delivering the fuel to the engine 9 and various conduits or tubes 2, 4, 6, 8 that carry air and fuel in gas or liquid state.

The various conduits carry and direct fluid throughout the vehicle fuel system 100. The fuel feed line 8 carries fuel from the fuel tank 1 to the engine 9. An evaporative line 6 carries accumulated fluid, which may include fuel vapors and liquid, from the fuel tank 1 to the vapor particle separator 3. One end of the evaporative line 6 is connected to the fuel tank 1 and the other end is connected to the vapor particle separator 3. A vapor line 4 carries fuel vapor from vapor particle separator 3 to the carbon canister 7. The vapor line 4 also connects the vapor canister 7 with the engine 9.

Figure 2:
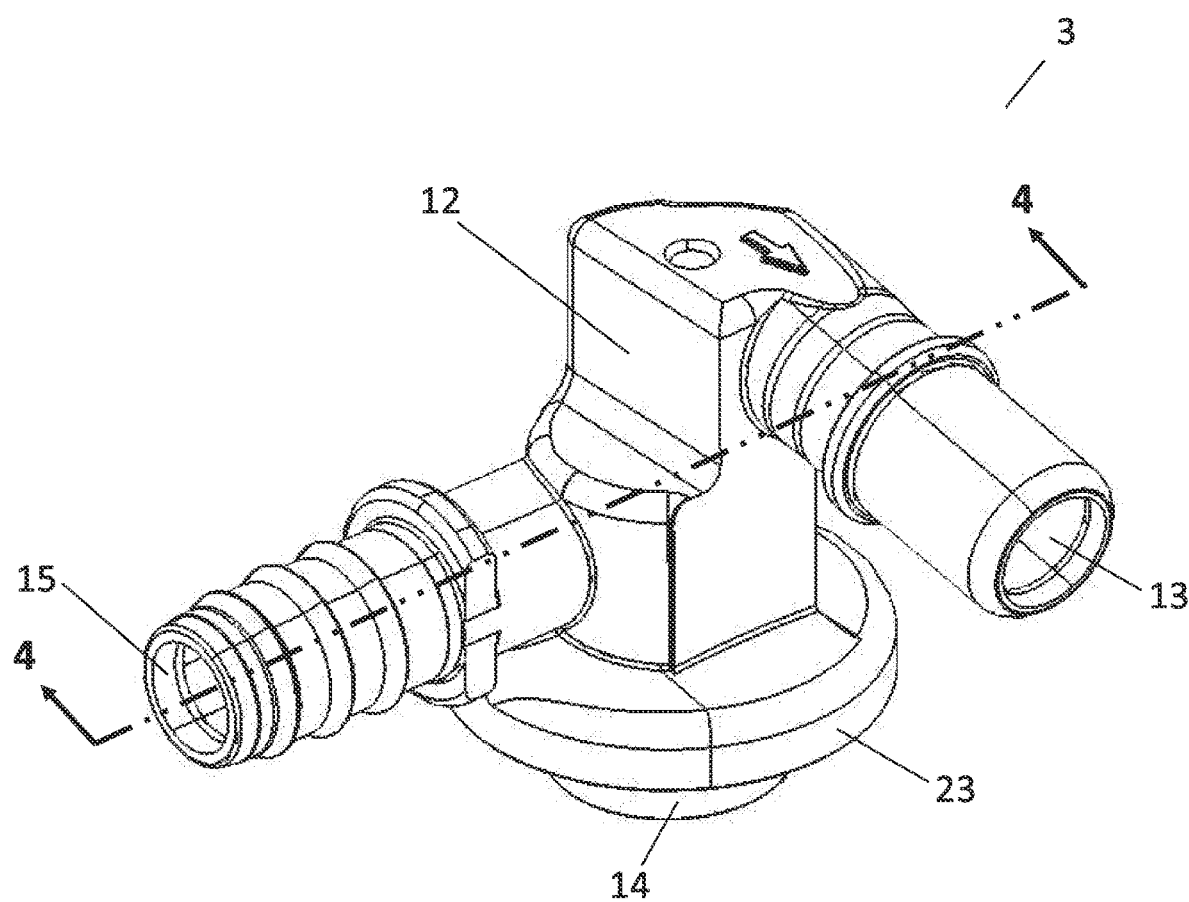
FIG. 2 is a perspective view of the vapor particle separator.
Figure 3:
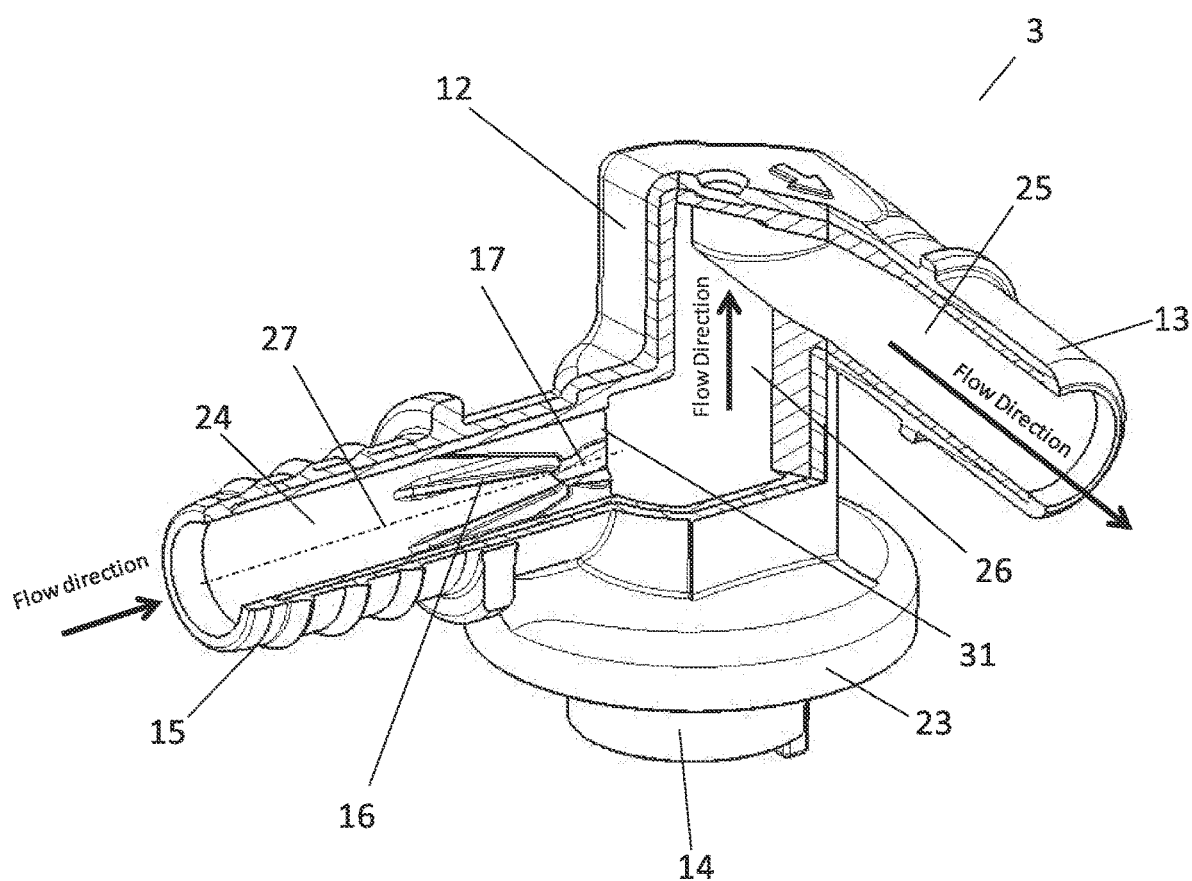
FIG. 3 is a perspective sectional view of the vapor particle separator.

FIGS. 1-3 show the vapor particle separator 3 that separates liquid fuel and fuel vapors traveling through the evaporative line 6. The vapor particle separator 3 is located in the fill neck 5 and connects the evaporative line 6 and the vapor line 4.

The vapor particle separator 3 has a housing 12 having a space 12', an inlet portion 15 to receive fluid from the evaporative line 6, deflector ribs 16 that deflect and separate the fuel, an outlet portion 13 that can carry the separated fuel vapors into the vapor line 4, a return portion 14 to return the liquid fuel droplets back into the fuel tank 1 through a filler tube 2, and a flange 23 to mount the vapor particle separator 3 to the fill neck 5.

Figure 4:
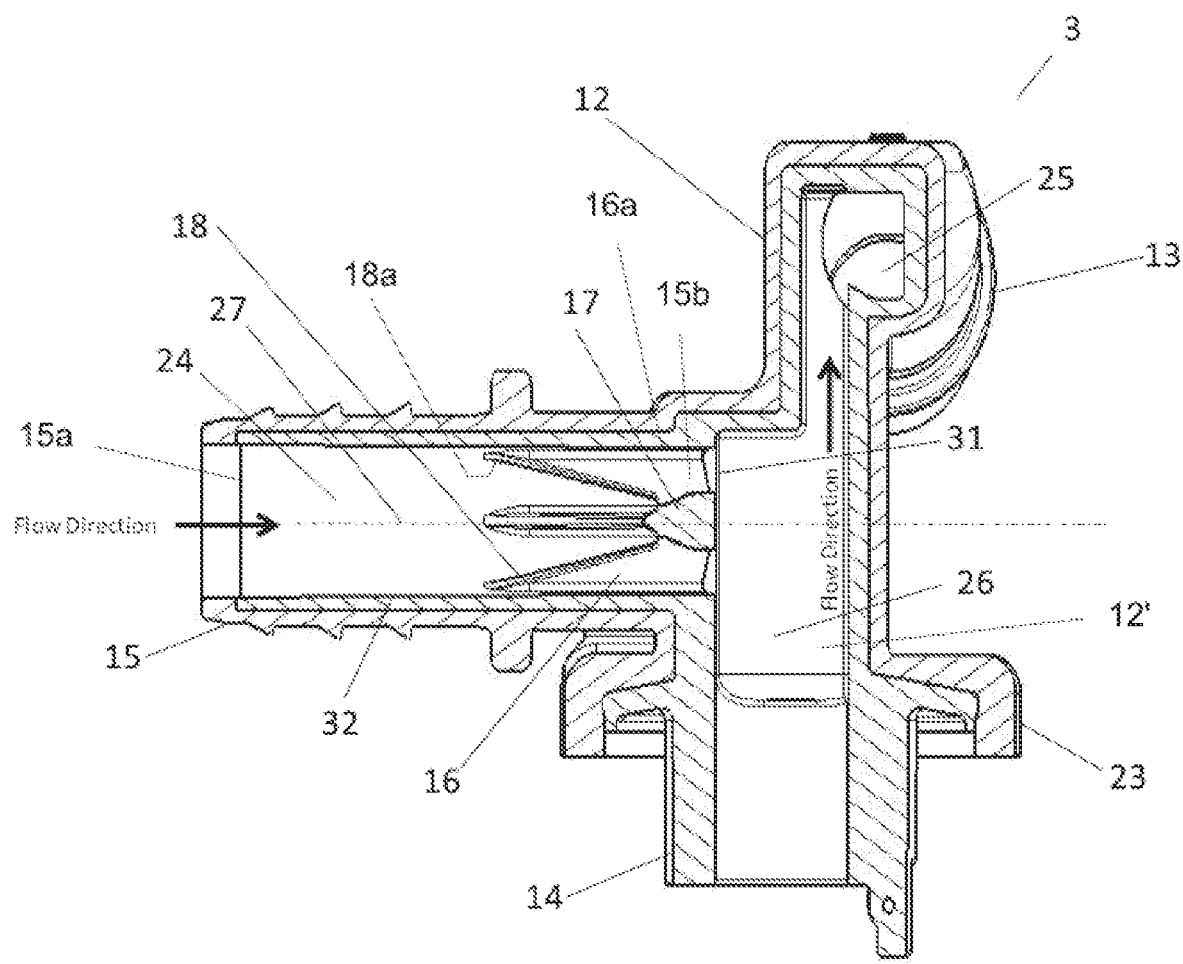
FIG. 4 is a sectional view taken along line 4-4 in FIG. 2 of the vapor particle separator.
Figure 5:
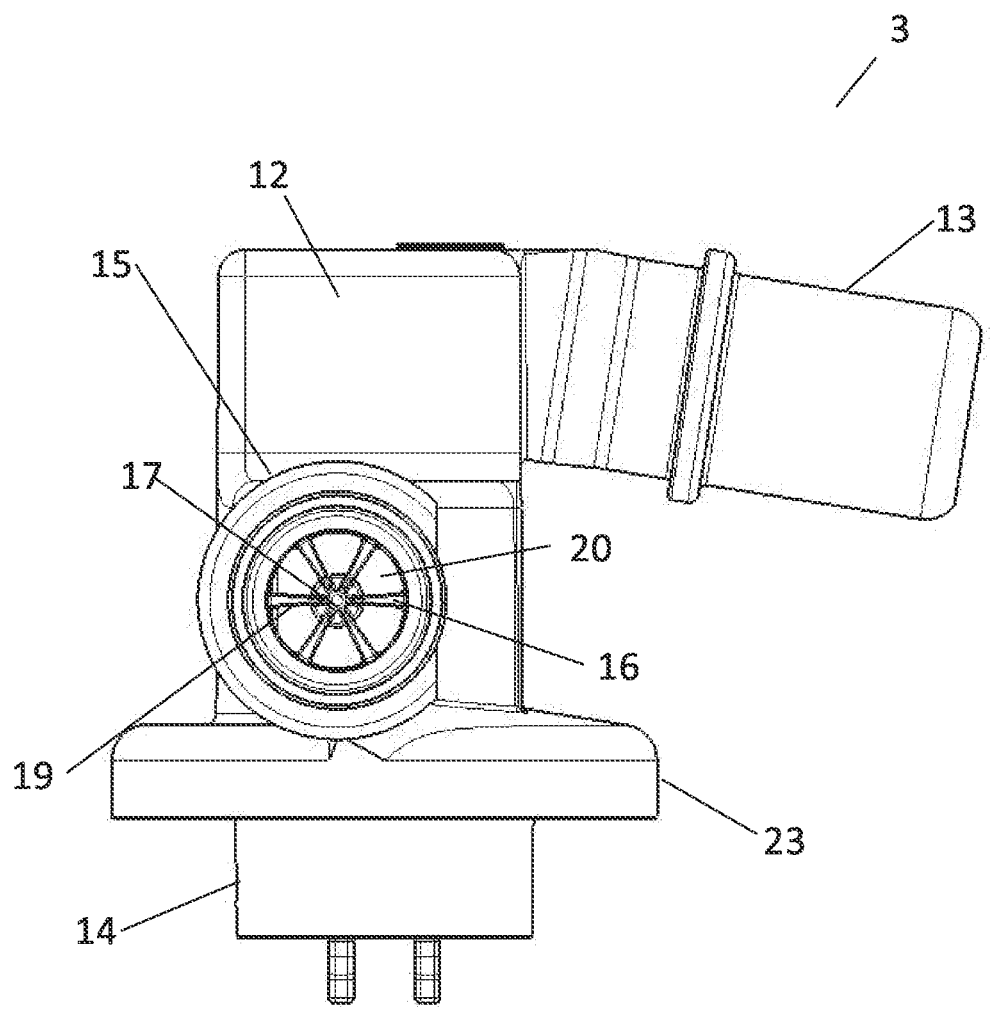
FIG. 5 is a side view looking into an inlet port of the vapor particle separator.
Figure 6:
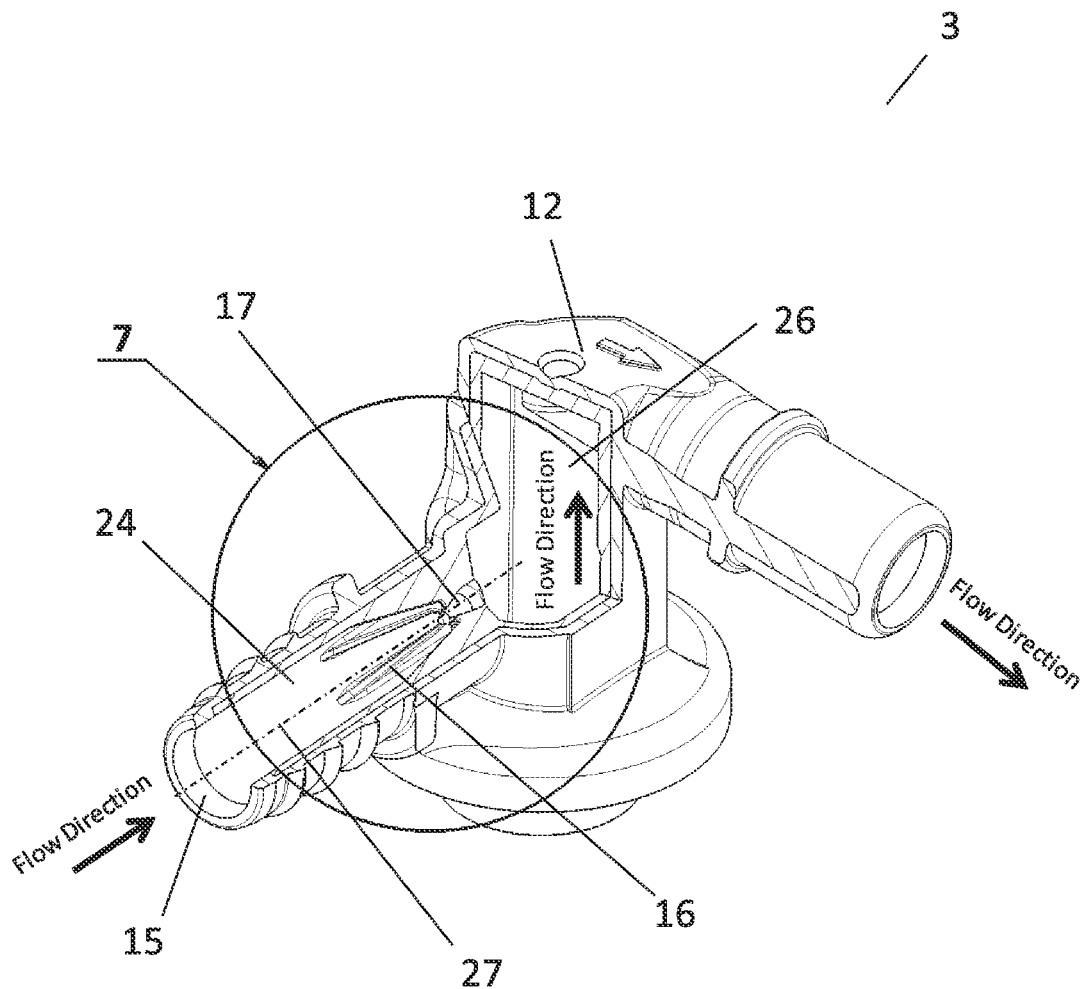
FIG. 6 is a perspective sectional view of the vapor particle separator.
Figure 7:
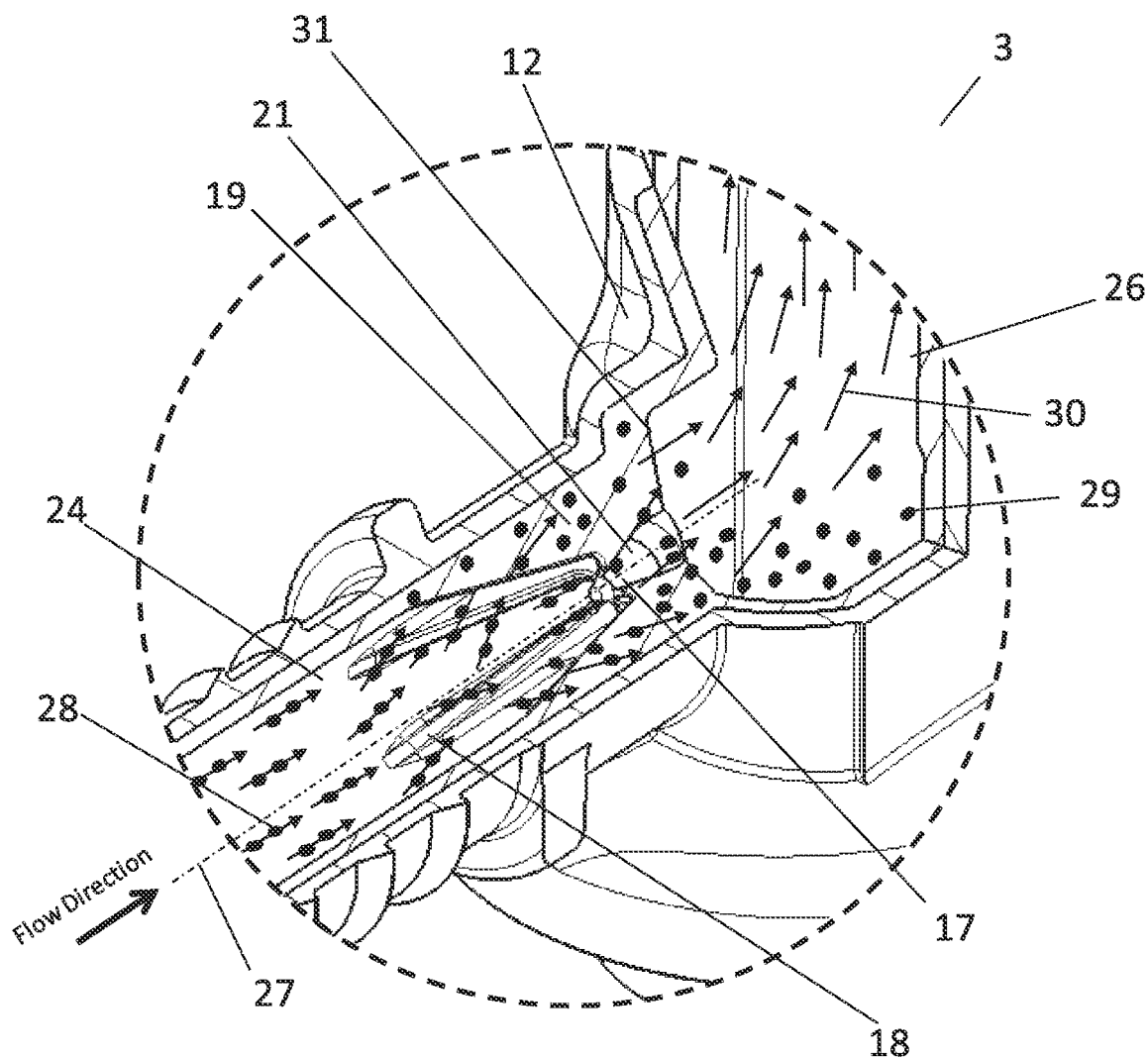
FIG. 7 is a detailed sectional view of the vapor particle separator

In FIGS. 4 and 5, the inlet port 15 receives the fluid coming from the evaporative line 6. The inlet portion 15 has a circular cross-section inlet passage 24 that contains deflector ribs 16 and a nose cone 17. As the fluid flows along the inlet passage 24, it is forced through the deflection ribs 16 and nose cone 17 at which time the liquid fuel droplets and fuel vapors are separated. The separated fuel droplets and fuel vapors flow from the inlet passage 24 into the inlet pipe 26. The inlet pipe 26 vertically connects the inlet passage 24, the outlet passage 25 and the drain portion 14 which allows the lite weight fuel vapors to rise up into the outlet passage 25 and flow out the outlet portion 13 while gravity pulls the heavier weight liquid fuel droplets down into the return portion 14 and back into the fuel tank 1.

FIGS. 4-7 show that deflector ribs 16 are located axially around a nose cone 17 that is centrally located on the center axis 27 of the inlet passage 24.

The nose cone 17 is of a cone shape with the apex on the center axis 27 of the inlet passage 24 tapering outward with the base ending at the face 31 of the inlet pipe 26. The base of the nose cone 17 is offset from an inner circular surface 32 of the inlet passage 24 creating an open space 20 between the base of the nose cone 17 and the inner circular surface 32 of the inlet passage 24.

Each of the deflector ribs 16 includes an outer portion 16a contacting the inner circular surface 32 of the inlet portion 15, a tapered surface 18 extending inwardly of the inlet portion 15 from an end 18a close to an inlet 15a of the inlet portion 15 toward the outlet portion 13, and an inner portion 15b connected to the nose cone 17.

The deflector ribs 16 are of a triangular shape with the apex of the tapered surface 18 starting halfway along the inner circular surface 32 of the inlet passage 24 angling inward to the center axis 27 of the inlet passage 24 with the base ending at the face 31 of the inlet pipe 26. With the tapered surfaces 18 of the deflector ribs 16 ending at the center axis 27 of the inlet passage 24, the deflector ribs 16 intersect with the tapered surface 21 of the nose cone 17. The side surfaces 19 of the deflector ribs 16 and the tapered surface 21 of the nose cone 17 create open space 20 passageways for the particles to flow.

The deflector ribs 16 and the nose cone 17 are integrally connected or molded with a cylindrical portion forming the inlet passage 24.

When the combined air/fuel particles 28 flow through the inlet passage 24, some portions of the flow are forced out and around the tapered surface 21 of the nose cone 17, while other portions are forced out and around the tapered surfaces 18 and side surfaces 19 of the deflection ribs 16, while still other portions of the flow through open spaces 20 between the nose cone 17 and the deflector ribs 16 which creates turbulence within the flow as these portions flow back together within the inlet passage 28 causing the air particles 30 to separate from the fuel particles 29. The fuel particles 29 are arrested to the side surfaces 19 of the deflection ribs 16 as well as the tapered surface 21 of the nose cone 17 while the air particles 30 flow into the inlet pipe 26. The air particles 30 flow from the inlet pipe 26 up out of the outlet passage 25 of outlet portion 13 to the carbon canister 7 while the fuel particles 29 gather and move along the sides surfaces 19 of the deflection ribs 16 and the tapered surface 21 of the nose cone 17 until they enter the inlet pipe 26 at which time gravity pulls the fuel particles 29 down into the return portion 14 to be returned to the fuel tank 1 through the fill neck 5 and filler tube 2.

While only selected embodiments have been chosen to illustrate the present invention, it will be apparent to those skilled in the art from this disclosure that various changes and modifications can be made herein departing from the scope of the invention as defined in the appending claims. For example, the size, shape, location, or orientation of the various components can be changed as needed. The foregoing descriptions of the embodiments according to the present invention are provided for illustration only, and not for the purpose of limiting as defined by the appended claims and their equivalents.

What is claimed is:

1. A vapor particle separator in a fuel system with a fuel tank, comprising:
    a separator housing including a space therein, an inlet portion adapted to receive fuel vapor and supply the fuel vapor to the space, an outlet portion extending from the space, and a return portion extending from the space and connected to the fuel tank, and
    a separator situated inside the inlet portion, and having a plurality of deflector ribs, and a nose cone situated in a center of the plurality of deflector ribs so that the plurality of deflector ribs is equally spaced apart from each other, and extends radially outwardly from the nose cone,
    wherein each of the deflector ribs has an outer portion contacting an inner circular surface of the inlet portion, a tapered surface extending inwardly in the inlet portion from an end close to an inlet of the inlet portion toward the outlet portion to form a triangular shape, and an inner portion connected to the nose cone, and
    wherein the fuel vapor enters the inlet portion and flows in and around the deflector ribs so that vapor particles are separated from the fuel vapor by the deflector ribs and exit through the outlet portion while droplets of the fuel vapor separated by the deflector ribs are returned to the fuel tank through the return portion.

2. A vapor particle separator according to claim 1, wherein the return portion is arranged at a side opposite to the outlet portion.

3. A vapor particle separator of claim 1, wherein each of the deflector ribs has a thickness gradually thinner from the outer portion to the inner portion.

4. A vapor particle separator of claim 1, further comprising a flange for mounting the housing to the fuel system.

5. A vapor particle separator of claim 1, wherein the fuel system further includes a vapor storage canister, to which the outlet passage is connected.

\* \* \* \* \*